(12) United States Patent
Long, Jr.

(10) Patent No.: US 6,822,780 B1
(45) Date of Patent: Nov. 23, 2004

(54) VERTICALLY STACKED SPATIAL LIGHT MODULATOR WITH MULTI-BIT PHASE RESOLUTION

(75) Inventor: William H. Long, Jr., Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/601,360

(22) Filed: Jun. 23, 2003

(51) Int. Cl.[7] .............................................. G02B 26/00
(52) U.S. Cl. ..................................... 359/291; 359/295
(58) Field of Search .............................. 359/291, 290, 359/292, 295, 237; 348/770

(56) References Cited

U.S. PATENT DOCUMENTS 5,652,672 A * 7/1997 Huignard et al. ........... 359/292
5,844,711 A 12/1998 Long, Jr. .................... 359/291

* cited by examiner

*Primary Examiner*—Scott J. Sugarman
*Assistant Examiner*—Richard Hanig
(74) *Attorney, Agent, or Firm*—Robert M. Wallace

(57) ABSTRACT

A spatial light modulator having n bits of phase resolution has n stacked layers of deformable electrode pairs supporting a deformable reflective surface, each electrode pair included in upper and lower stacked elongate ribbon conductors extending in respective orthogonal directions, each coincidence of an upper and lower electrode pair defining a pixel within the respective stacked layer, each electrode pair deforming to a maximum deformation in response to an applied write voltage across the pair so as to produce at the reflective layer a phase correction of the corresponding pixel proportional to the corresponding deformation, and wherein the maximum deformation of the pixels in each stacked layer is the same, and wherein the maximum deformation of successive layers decreases in ascending order of the stacked layers.

29 Claims, 10 Drawing Sheets

VERTICALLY STACKED SPATIAL LIGHT MODULATOR WITH MULTI-BIT PHASE RESOLUTION

BACKGROUND OF THE INVENTION

Spatial light modulators have a wide range of practical uses, such as video display or projection. They are also employed in correcting phase aberrations in a light beam caused by atmospheric effects. Phase aberrations are readily determined using well-known optical techniques, from which corrective phase. A spatial light modulator can correct such phase aberrations by imposing respective phase shifts for different picture elements (pixels) in an image plane. Such a spatial light modulator can be fabricated in a silicon-on-insulator structure as disclosed in U.S. Pat. No. 5,844,711. In that patent, a planar reflective layer containing a conductive thin film is deformed toward another planar layer containing its own conductive thin film by a voltage (e.g., 40 volts) applied between the two conductive thin films. In this device, the deformation is a quarter wavelength of the light for a half wavelength phase shift. Each pixel then has either a half wavelength phase correction or zero phase correction, depending upon the control voltage applied to that pixel. As the deformation draws the two conductive thin films closer to one another, the electrostatic attractive force increases until it exceeds the opposing mechanical force of elastic deformation. At this point, the one layer snaps hard against the opposing layer and remains at a maximum deflection, as long as a very small remnant voltage (e.g., 10 volts) is maintained. The pixel is returned to its original undeformed condition by removing the remnant voltage. Thus, once a maximum deflection has been made, the applied voltage may be removed, except for a small remnant, while retaining the phase correction. In the proposed device this feature is exploited to facilitate row-by-row application of a desired spatial phase correction pattern. Of course, such a spatial light modulator is of limited accuracy in that it is incapable of providing non-zero phase corrections of less than a half wavelength, and each pixel correction is a binary choice: ON (half wavelength phase shift) and OFF (zero phase shift). Thus, it may be said to have only one-bit accuracy.

To date, it has not seemed practical to improve accuracy of such devices beyond a single bit. One way of increasing accuracy would seem to be applying different voltage levels to attain different amounts of deformation. For example, four bits of accuracy could be attained by assigning four different voltage levels to choose among for the applied voltage. The main problem with this approach is that the voltage levels must be limited in order to keep the deformation less than the maximum or critical deformation (at which the surface snaps into the maximum deformation), in order to stay within a range in which different voltage levels produce different amounts of deformation. Unfortunately, this requires that the applied voltage remain on, which prevents row-by-row imaging of a desired spatial phase correction pattern. The way around this problem is to provide individual conductors for each pixel, but this greatly increases the complexity of the device, leading to congestion of many conductive paths on the substrate surface. One way of alleviating such congestion is to place the pixel control circuitry on the back of the substrate with metal contacts established through the entire thickness of the device. However, such an approach is limited by the small pixel area and greatly increases cost and device complexity.

Even if such a multi-voltage level approach were practical, it would suffer from a more fundamental limitation arising from variations in device characteristics across the surface of the substrate. Process variations are unavoidable and necessarily lead to different thin film thicknesses in different areas of the substrate. Variations in thickness lead to variations in mechanical stiffness across the substrate. As a result, the amount of deformation (and therefore the phase shift) produced at a particular applied voltage level will be different in different areas of the substrate. Such variations reduce the pixel-to-pixel accuracy of the spatial light modulator. Solving this problem requires a significant tightening of fabrication process controls, which increases the cost even further.

Therefore, it has seemed too costly or impractical to provide a spatial light modulator having more than single bit accuracy.

SUMMARY OF THE INVENTION

A spatial light modulator having n bits of phase resolution has n stacked layers of deformable electrode pairs supporting a deformable reflective surface, each electrode pair included in upper and lower stacked elongate ribbon conductors extending in respective orthogonal directions, each coincidence of an upper and lower electrode pair defining a pixel within the respective stacked layer, each electrode pair deforming to a maximum deformation in response to an applied write voltage across the pair so as to produce at the reflective layer a phase correction of the corresponding pixel proportional to the corresponding deformation, and wherein the maximum deformation of the pixels in each stacked layer is the same, and wherein the maximum deformation of successive layers decreases in ascending order of the stacked layers.

The maximum deformation can decrease with successive ones of the n stacked layers by ascending negative powers of 2, wherein a phase correction can be written to an individual one of the pixels with n-bit accuracy. The lower ribbon conductors typically are mutually parallel in a first direction and coplanar in a first plane, and the upper ribbon conductors typically are mutually parallel in a second direction orthogonal to the first direction and coplanar in a second plane vertically displaced from the first plane.

Each one of the layers typically includes elongate ribs between respective ones of the lower elongate ribbon conductors that are within the one layer, the ribs providing support to the upper elongate conductors to form therebetween a compression gap defining the maximum deformation, and a deformable membrane resting on top of the ribs and supporting the upper elongate ribbon conductors that are within the one layer. Typically, a table supports the lower ribbon conductors of the bottom one of the layers and an insulating layer between the table and the lower ribbon conductors of the bottom one of the layers. Typically, an insulating layer lies between the deformable membrane and the upper ribbon conductors and an insulating layer covers the lower elongate ribbon conductors. Another insulating layer typically covers the upper elongate ribbon conductors. The layers can be separated by pedestals, each pedestal extending between the upper elongate ribbon conductors and the table of the layer immediately above the one layer.

DETAILED DESCRIPTION OF THE INVENTION

Figure 1:
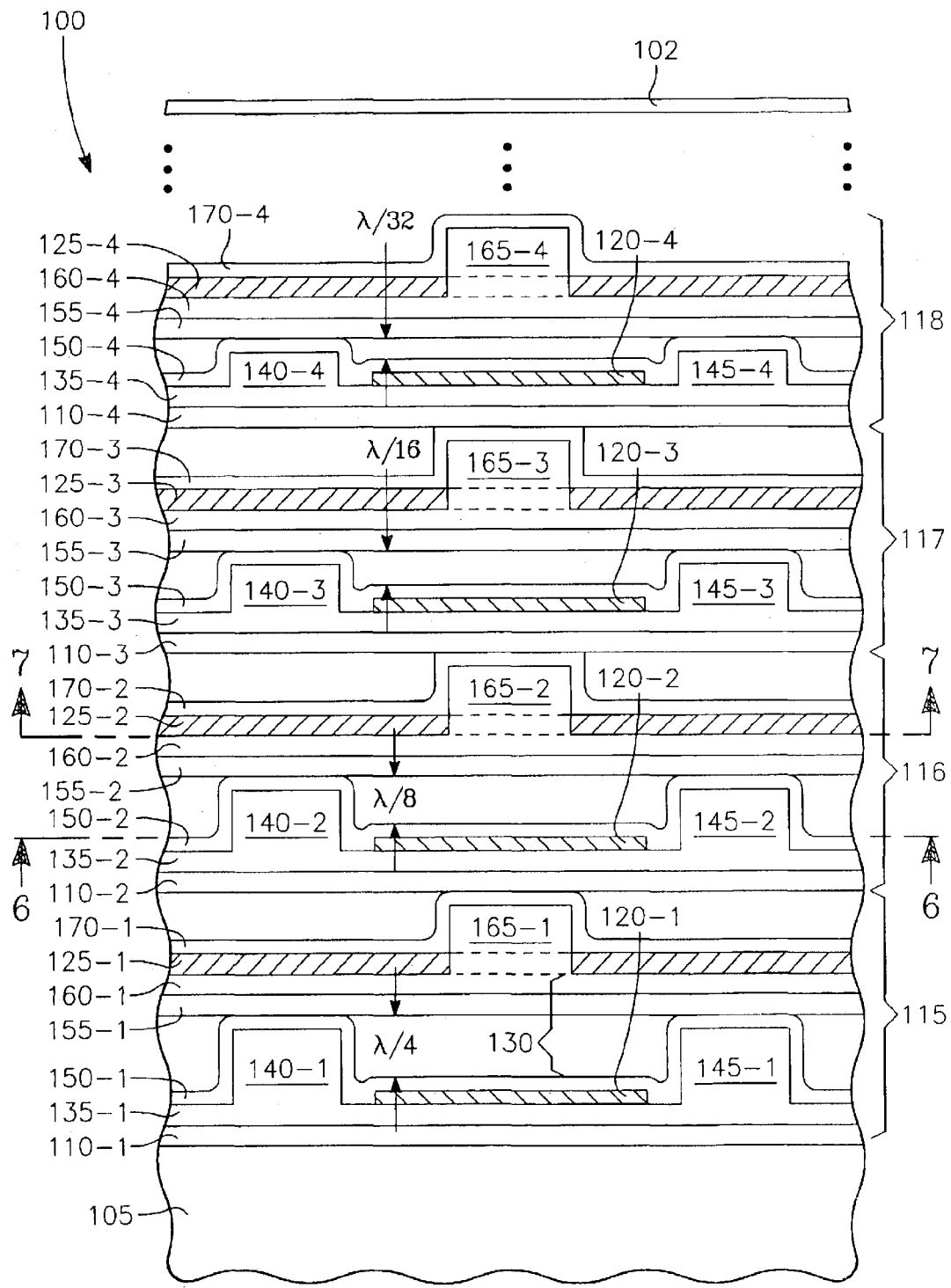
FIG. 1 is a cut-away cross-sectional side view of a light modulator embodying the invention.

Referring now to FIG. 1, a multi-bit spatial light modulator with common row and column addressing is formed in a silicon-on-insulator structure having a semiconductor substrate 105 with a top region forming a semiconductor table 110-1. The semiconductor material may be intrinsic, or free of p- or n-type dopant impurities. The spatial light modulator 100 has a deformable top reflective layer 102 over a number n of vertically stacked planar layers, the first four of which are illustrated in FIG. 1 as layers 115, 116, 117, 118. Each layer 115, 116, 117, 118 is separately compressible in the vertical direction to deform the reflective layer 102. For this purpose, each pixel in each layer contains a pair of parallel planar electrodes closely spaced from one another by a vertical gap. Applying a voltage across the pair of electrodes draws them together to compress the respective layer.

The base layer 115 has planar parallel ribbon electrodes 120-1 extending in columns and planar parallel ribbon electrodes 125-1 extending in rows over the column electrodes 120-1 and closely spaced therefrom by a vertical gap 130. The row and column layout of the ribbon electrodes 120-1, 125-1 is depicted for a typical layer in FIG. 2. In the individual layer depicted in FIG. 2, a pixel 100 is formed by each intersection of a column electrode 120 with a row electrode 125. The enlarged cross-sectional side view of FIG. 1 includes only a single pixel whose structure is typical of all pixels 100. The structure of the single pixel visible in FIG. 1 will now be discussed. The base layer 115 includes a first insulator layer 135-1 that forms a pair of ribs 140-1, 145-1. One of the parallel column electrodes 120-1 lies between the ribs 140-1, 145-1 on top of the first insulator layer 135-1. A second insulator layer 150-1 covers the column electrode 120-1 and the remainder of the first insulator layer 135-1. A semiconductor planar membrane 155-1 is supported on the ribs 140-1, 145-1. A third insulator layer 160-1 covers the membrane 155-1 and forms an upwardly extending pedestal 165-1. One of the parallel row electrodes 125-1 lies on the third insulator layer 160-1 and extends around the pedestal 165-1. A fourth insulator layer 170-1 covers the row electrode 125-1 and the pedestal 165-1.

The second layer 116 has an identical structure including a semiconductor table 110-2, a first insulator layer 135-2 over the semiconductor table 110-2 and forming a pair of ribs 140-2, 145-2, a column electrode 120-2 on the first insulator layer 135-2 between the pair of ribs, a second insulator layer 150-2 covering the electrode 120-2, a semiconductor membrane 155-2 supported on the ribs 140-2, 145-2, a third insulator layer 160-2 on the membrane 155-2 forming a pedestal 165-2 and supporting a row electrode 125-2 that extends around the pedestal 165-2. A fourth insulator layer 170-2 covers the row electrode 125-2 and the pedestal 165-2.

The third layer 117 has an identical structure including a semiconductor table 110-3, a first insulator layer 135-3 over the semiconductor table 110-3 and forming a pair of ribs 140-3, 145-3, a column electrode 120-3 on the first insulator layer 135-3 between the pair of ribs, a second insulator layer 150-3 covering the electrode 120-3, a semiconductor membrane 155-3 supported on the ribs 140-3, 145-3, a third insulator layer 160-3 on the membrane 155-3 forming a pedestal 165-3 and supporting a row electrode 125-3 that extends around the pedestal 165-3. A fourth insulator layer 170-3 covers the row electrode 125-3 and the pedestal 165-3.

The fourth layer 117 has an identical structure including a semiconductor table 110-4, a first insulator layer 135-4 over the semiconductor table 110-4 and forming a pair of ribs 140-4, 145-4, a column electrode 120-4 on the first insulator layer 135-4 between the pair of ribs, a second insulator layer 150-4 covering the electrode 120-4, a semiconductor membrane 155-4 supported on the ribs 140-4, 146-4, a third insulator layer 160-4 on the membrane 155-4 forming a pedestal 165-4 and supporting a row electrode 125-4 that extends around the pedestal 165-4. A fourth insulator layer 170-4 covers the row electrode 125-4 and forms a planar reflective top surface 175.

Thus, each of the four major layers 115, 116, 117, 118 consists of semiconductor and insulator layers. Each semiconductor layer preferably is intrinsic crystalline silicon. Each insulator layer preferably is silicon dioxide.

Figure 3:
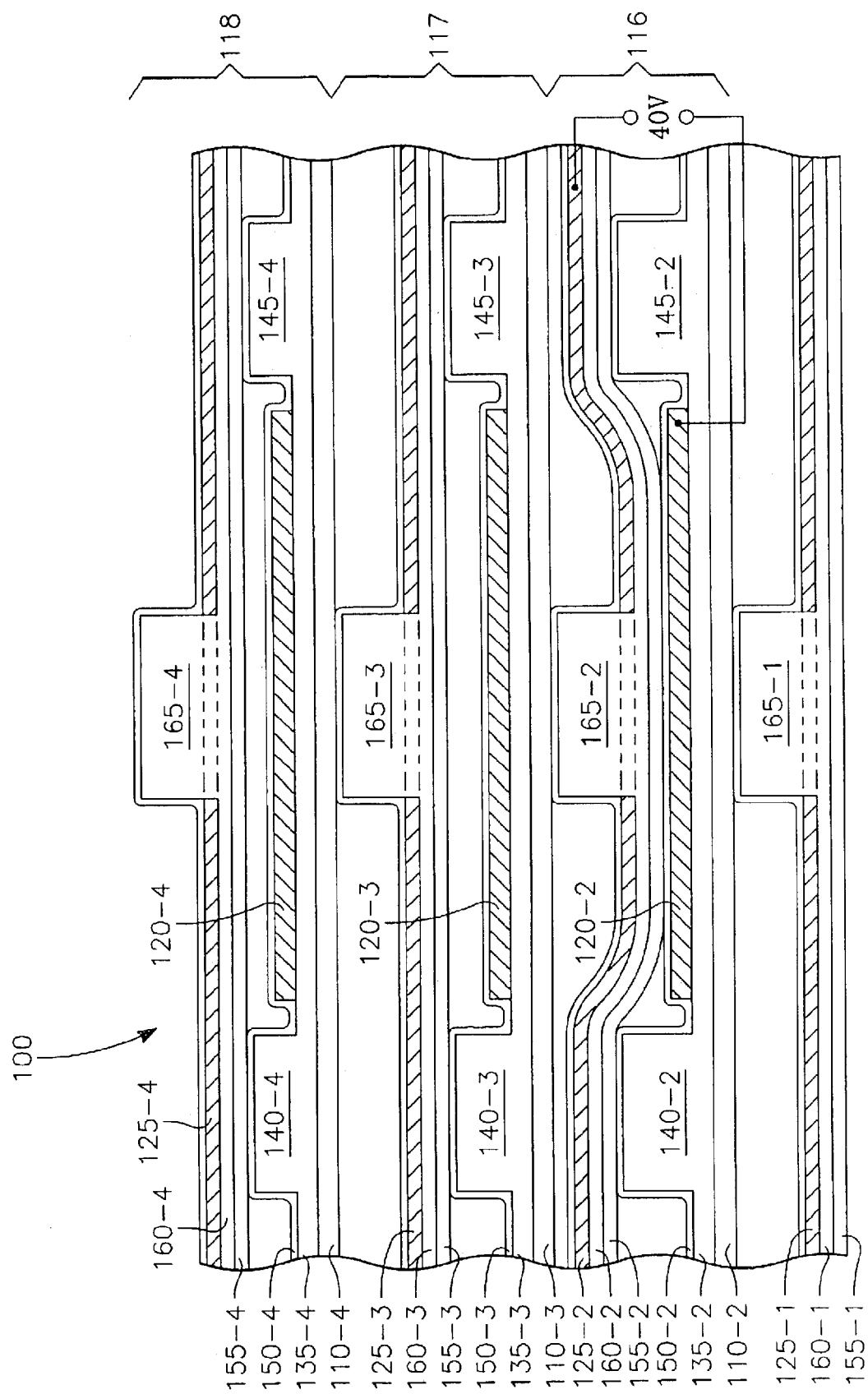
FIG. 3 is an enlarged view corresponding to FIG. 1, illustrating the effects of an applied voltage.

FIG. 3 illustrates the three upper layers 116, 117, 118, with the layer 116 being compressed. In this case, a large voltage (e.g., 40 volts) is applied between the column and row electrodes 120-2, 125-2 of the particular pixel 100 depicted in the drawing of FIG. 3, so that the two electrodes are drawn together, causing the membrane 155-2 to deform between the two ribs 140-2, 145-2 until the membrane 155-2 lies against the top of the insulator layer 150-2. This causes the reflective top surface 175 to drop down by a distance equal to the uncompressed distance (FIG. 1) across the void between the top of the insulator layer 150-2 and the bottom of the semiconductor table 155-2. This height of this void will be referred to hereinafter as the compression gap and is determined by the height of the ribs 140, 145 of the respective layer.

Figure 2:
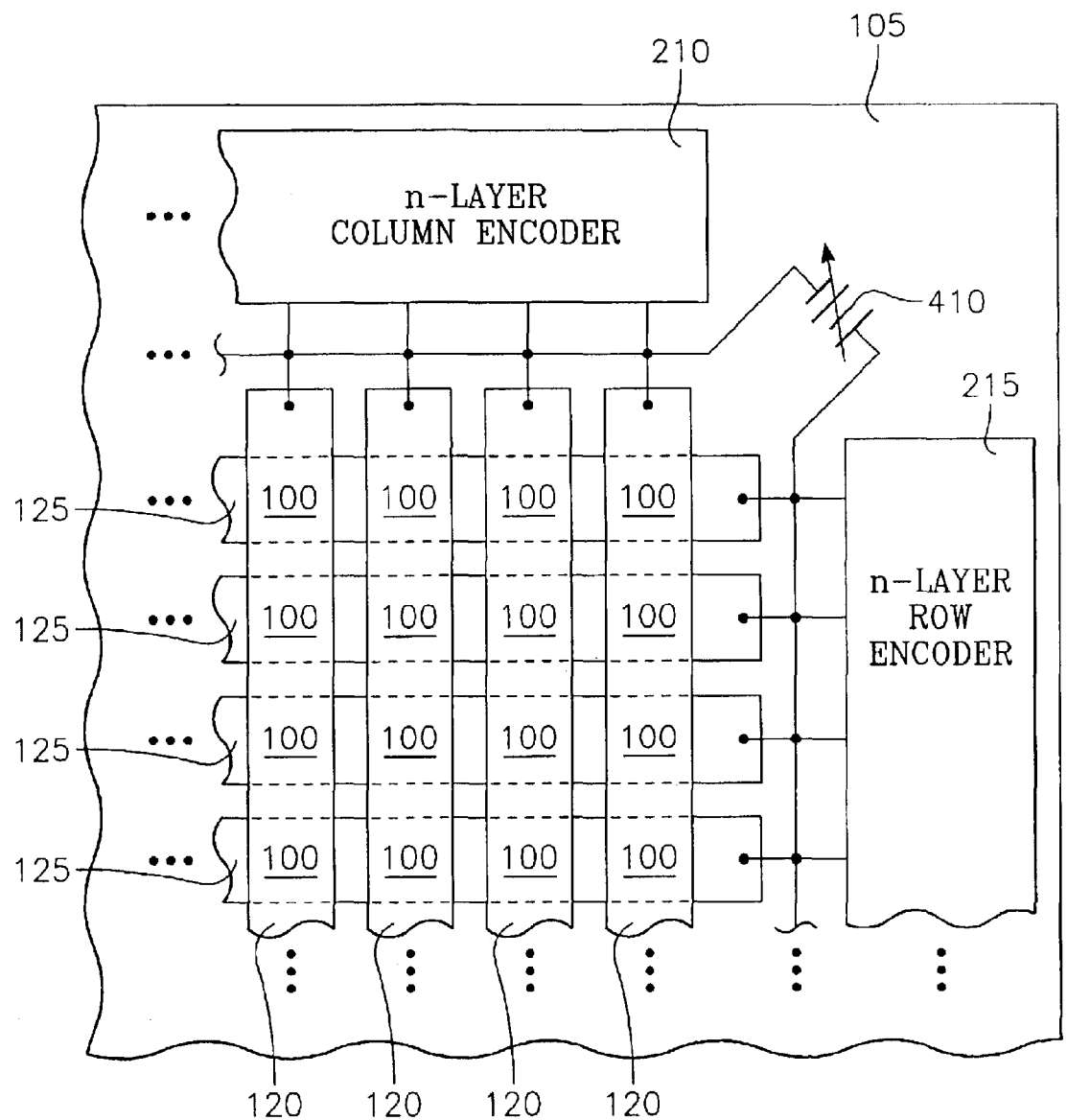
FIG. 2 is a top view corresponding to FIG. 1.
Figure 4:
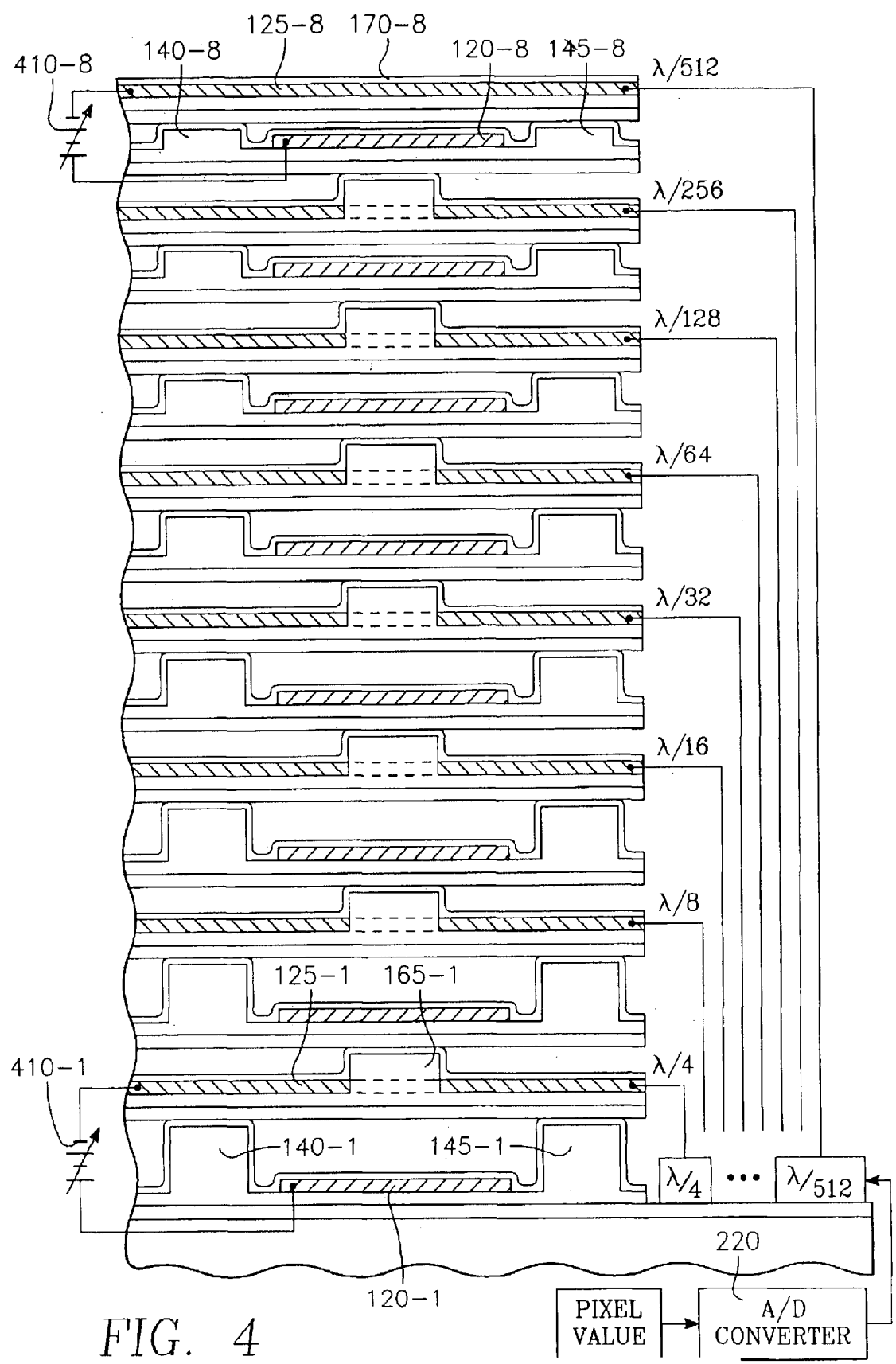
FIG. 4 is a view corresponding to FIG. 1 illustrating an encoding structure.

The compression gaps of the four layers 115, 116, 117, 118 progressively decrease by factors of two, the compression gap of the first layer 115 being a quarter wavelength, the compression gap of the second layer 116 being one eighth of a wavelength, the compression gap of the third layer 117 being one sixteenth of a wavelength and the compression gap of the fourth layer 118 being one thirty-second of a wavelength, as indicated in FIG. 1. Thus, any fraction of a quarter wavelength deformation can be realized at a given pixel 100 with four-bit accuracy. The top view of FIG. 2 shows a column encoder 210 on the substrate 105 controlling the column electrodes 120 and a row encoder 215 controlling the row electrodes 125. Each of the encoders 210, 215 controls four layers of electrodes. Thus, for example, in the side view of FIG. 4 (showing all eight layers instead of only the first four), the row encoder 215 controls all eight layers of row electrodes including the first four row electrodes 125-1, 125-2, 125-3, 125-4. For the single pixel that is visible in the side view of FIG. 4, there are eight row encoder outputs corresponding to the eight layers, with bit places corresponding to ascending negative powers of 2. The units are, in the illustrated embodiment, a quarter wavelength. A phase correction is applied to an eight-bit analog-to-digital converter 220 which then selects the appropriate bits for enablement. Enabling a bit entails applying a full deflection voltage (e.g., 40 volts) across the pair of electrodes 120, 125 of the selected layer in the particular pixel. In the drawing of FIG. 4, all eight layers are shown, so that the top (eighth) layer is seen, including the elements 120-8, 125-8, 140-8, 145-8 and 170-8. The top insulator layer 170-8 of FIG. 4 is the reflective planar layer 102 of FIG. 1.

Figure 5:
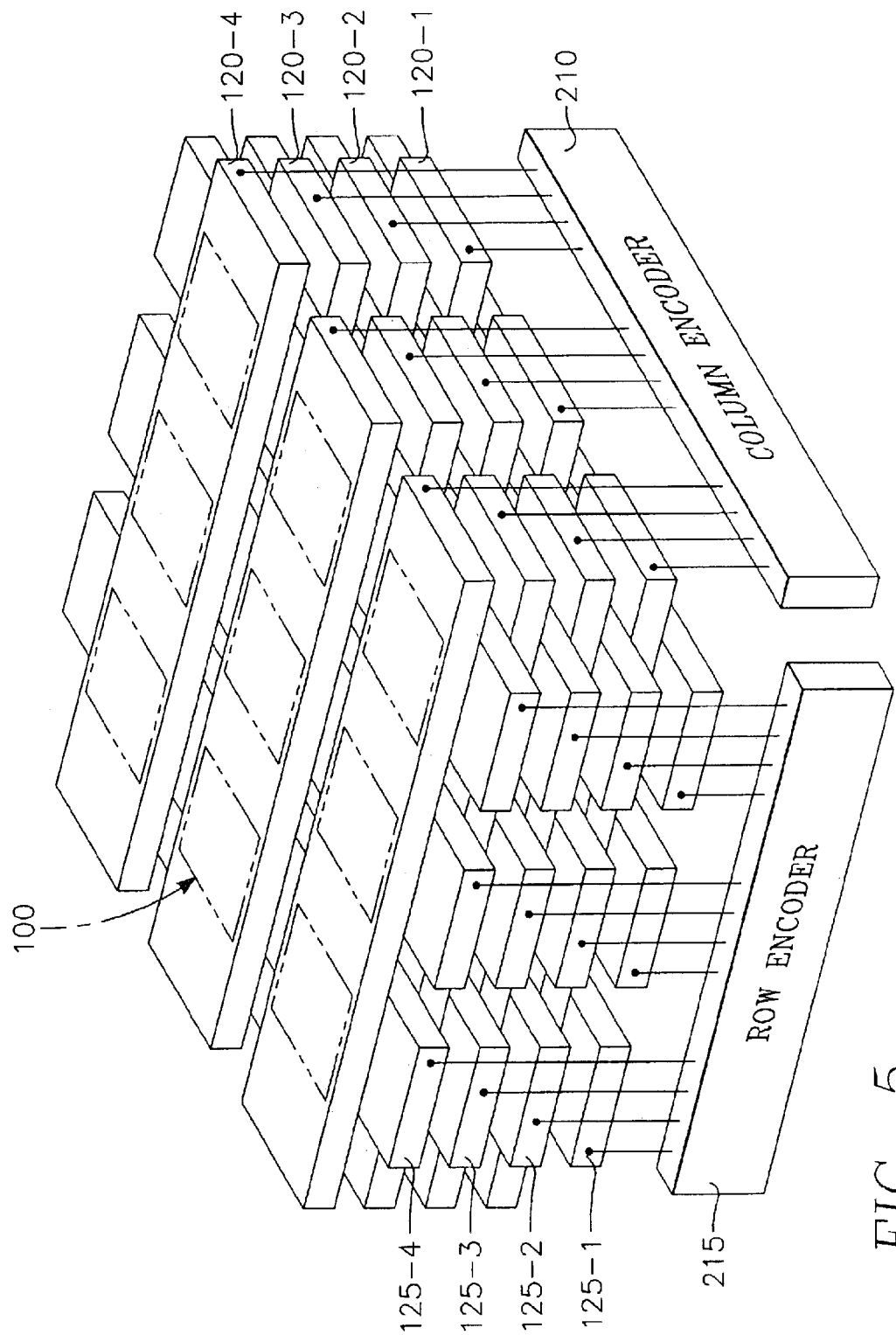
FIG. 5 is a perspective view corresponding to FIG. 1.

The three-dimensional addressing structure linking the column and row encoders 210, 215 to the multi-level column and row electrode arrays is illustrated in FIG. 5 (showing only the first four layers). The column encoder 210 is connected to four layers of column electrodes 120-1, 120-2, 120-3, 120-4 in each column, there being n columns. The row encoder 215 is connected to four layers of row electrodes 125-1, 125-2, 125-3, 125-4 in each row, there being m rows. The number of pixels 100 is n×m. The four layers in each column and each row have compression gaps arranged vertically in ascending order of negative powers of 2. FIG. 5 illustrates the case of four-bit accuracy using four layers of row and column electrodes. However, the number of bits may be increased by increasing the number of layers.

Figure 6:
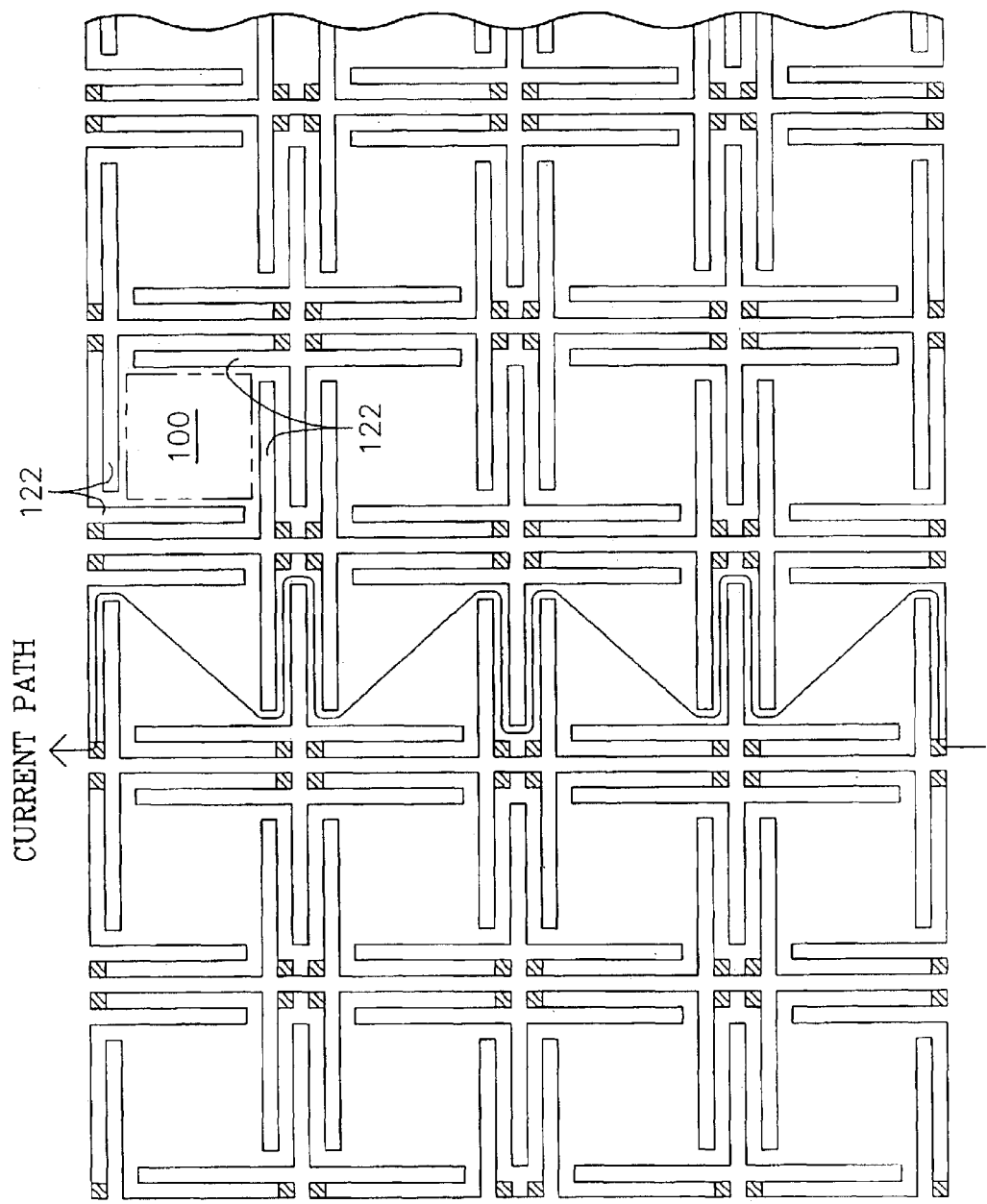
FIG. 6 illustrates a cross-sectional view taken along lines 6—6 of FIG. 1.
Figure 7:
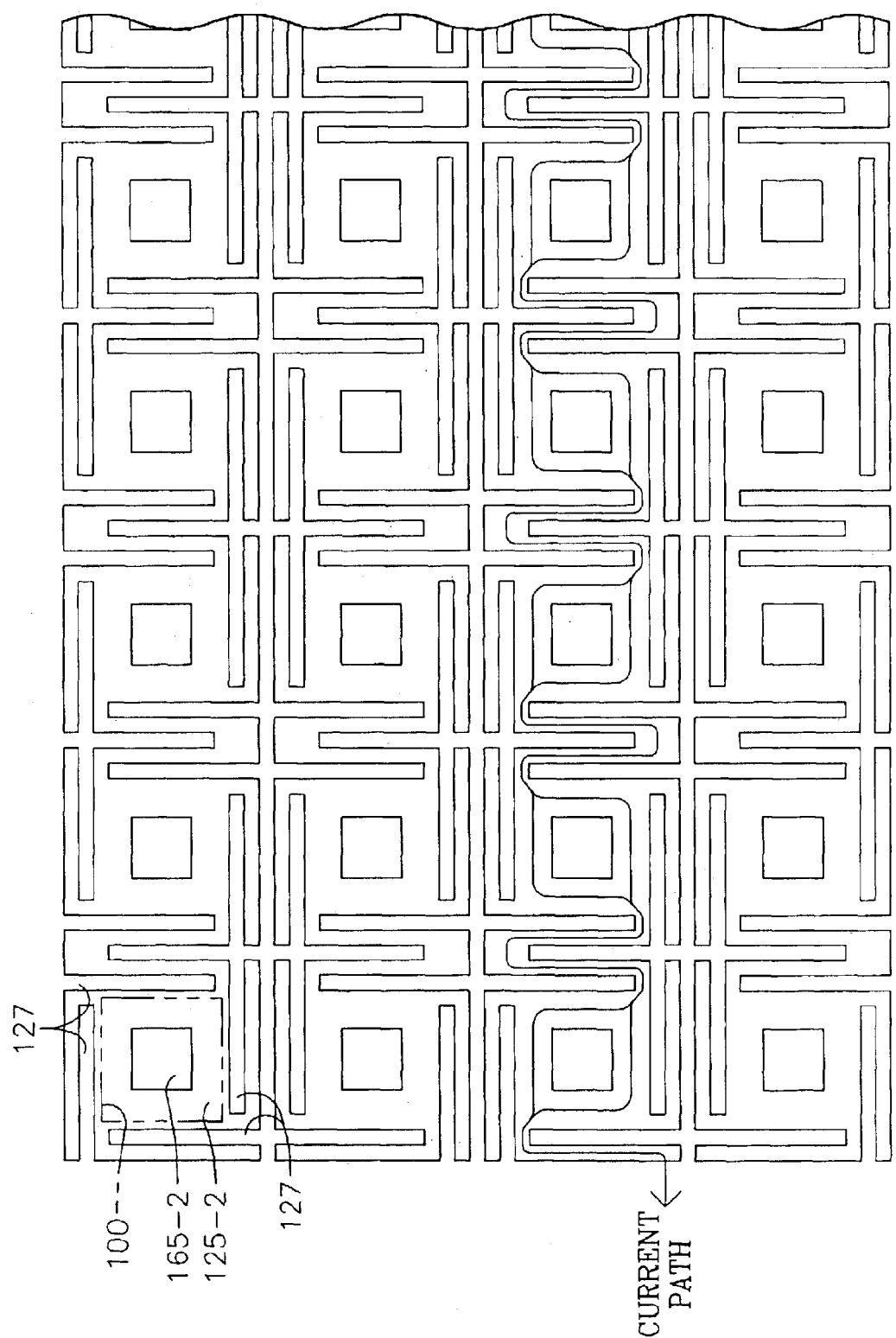
FIG. 7 illustrates a cross-sectional view taken along lines 7—7 of FIG. 1.

The lower and upper electrodes 120, 125 in each layer 115, 116, 117, 118 may be patterned to enhance flexibility and thereby reduce the voltage required to attain full deformation. FIG. 6 is a top cross-sectional view of the lower electrodes 120-2 in the second layer 116 taken along lines 6—6 of FIG. 1. Apertures 122 are formed in the electrodes 120-1 near the regions of greatest bending, which are at the periphery of each pixel 100. A typical current path is indicated in the drawing of FIG. 6. FIG. 7 is a top cross-sectional view of the upper electrodes 125-2 in the second layer 116 taken along lines 7—7 of FIG. 1. Apertures 127 are formed in the electrodes 125-2 near the regions of greatest bending, which are at the periphery of each pixel 100. FIG. 7 shows how each row electrode 125-2 passes around the periphery of each pedestal 165-2 in its row. Each pedestal 165-2 is located at the center of a corresponding pixel 100. With flexibility-enhancing apertures 122, 127 in the respective electrodes 120-2, 125-2, both electrodes deform toward one another as the applied voltage increases. The apertures 122 in the column electrodes 120-2 pass through not only the column electrodes 120-2 but also the semiconductor and insulator layers attached to them, i.e., the semiconductor layer 110, the insulator layer 135-2 and the insulator layer 150-2. The apertures 127 in the row electrodes 125-2 pass through not only the column electrodes 120-2 but also through the semiconductor and insulator layers attached to them, i.e., the semiconductor layer 155-2, the insulator layer 160-2 and the insulator layer 170-2. This ensures maximum flexibility of the electrodes and all of the thin films that must flex with them. A typical current path is indicated in the drawing of FIG. 7.

Figure 8:
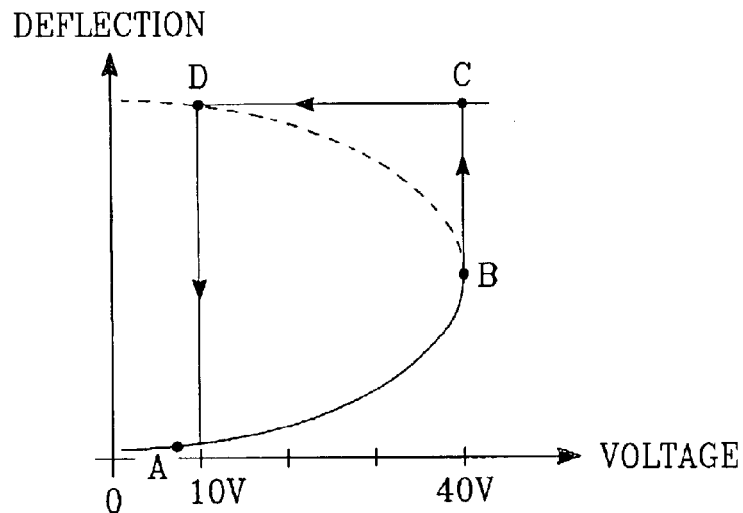
FIG. 8 is a graph illustrating deflection of an elastic layer in the embodiment of FIG. 1 as a function of applied voltage.

FIG. 8 is a graph illustrating electrode deflection as a function of applied voltage between opposing electrodes for a typical one of the row electrodes 125-1 through 125-4. As the voltage is increased along the curve AB, the deflection increases at an increasing rate due to the decrease in electrode-to-electrode displacement and the resulting increase in electrostatic force. At point B (i.e., at about 38 volts), the electrostatic force associated with the now very small electrode-to-electrode displacement, overwhelms the opposing mechanical/elastic force, so that the electrode snaps into its final position or full deflection at point C. As the applied voltage is decreased along the line CD, the electrode remains at its full deflection. At point D, the applied voltage falls below the value required to maintain full deflection (~1 v) and the electrode springs back to point A, which allows the electrode to return to the deflection behavior along the curve AB.

Figure 9:
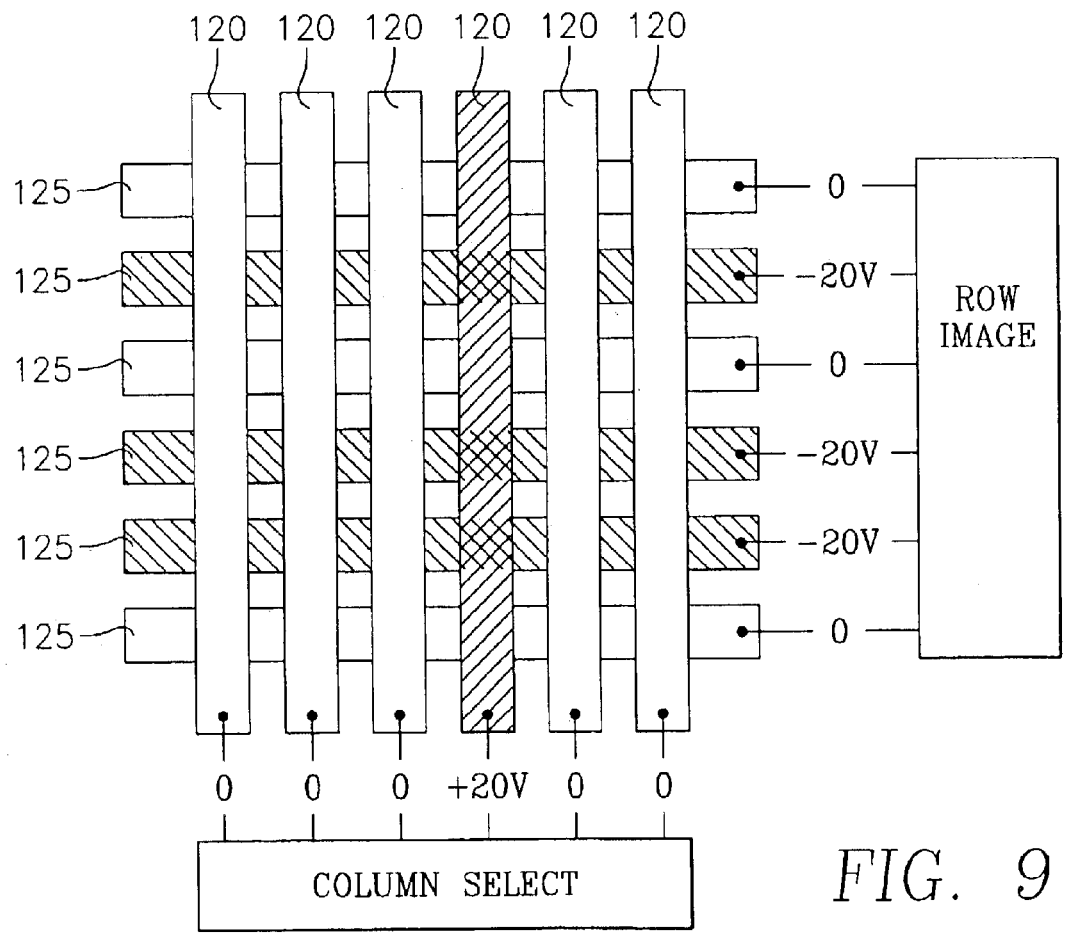
FIG. 9 is a view corresponding to FIG. 2 illustrating how an individual pixel is addressed.
Figure 10A:
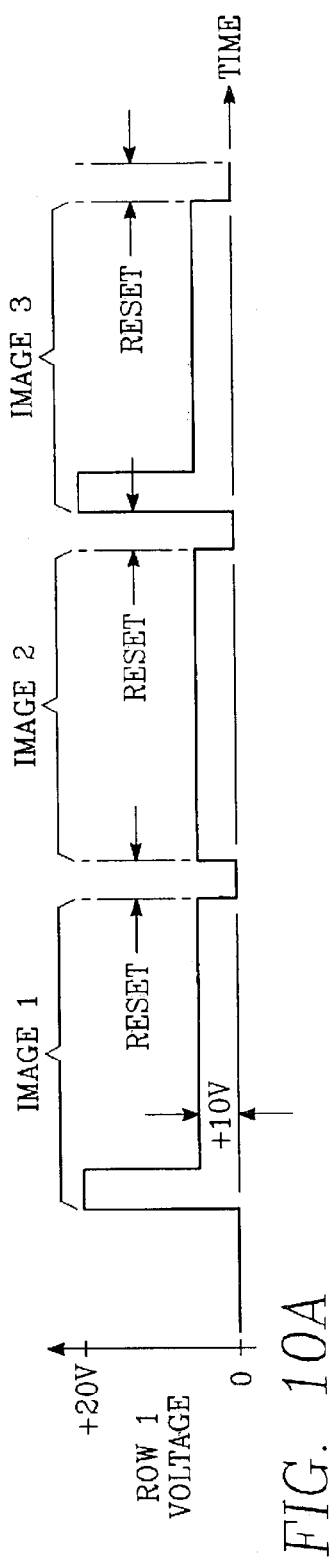
FIGS. 10A, 10B and 10C are contemporaneous timing diagrams illustrating how control voltages are applied in the apparatus of FIG. 1 to implement the addressing scheme of FIG. 9.
Figure 10B:
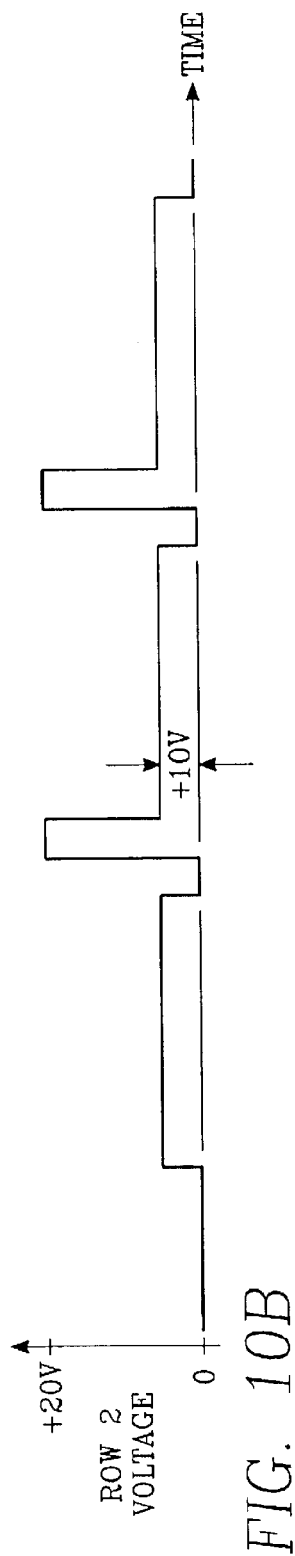
Figure 10C:
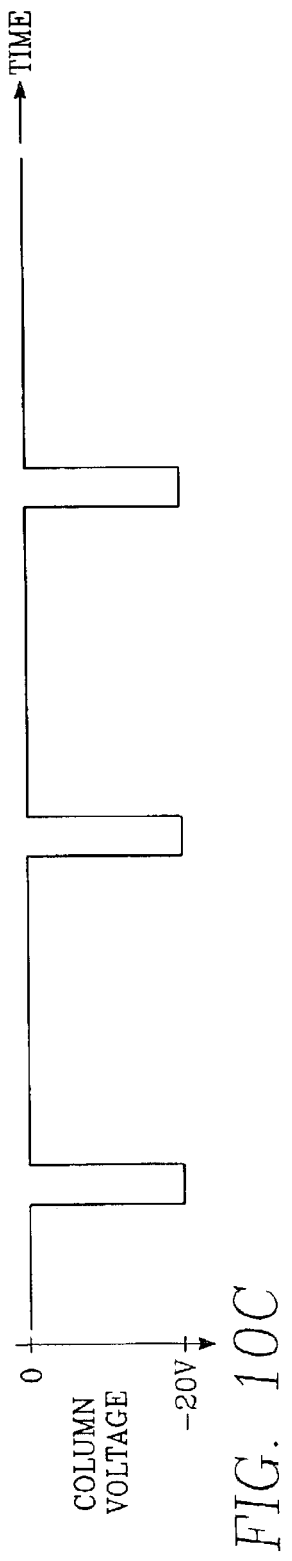
Figure 11A:
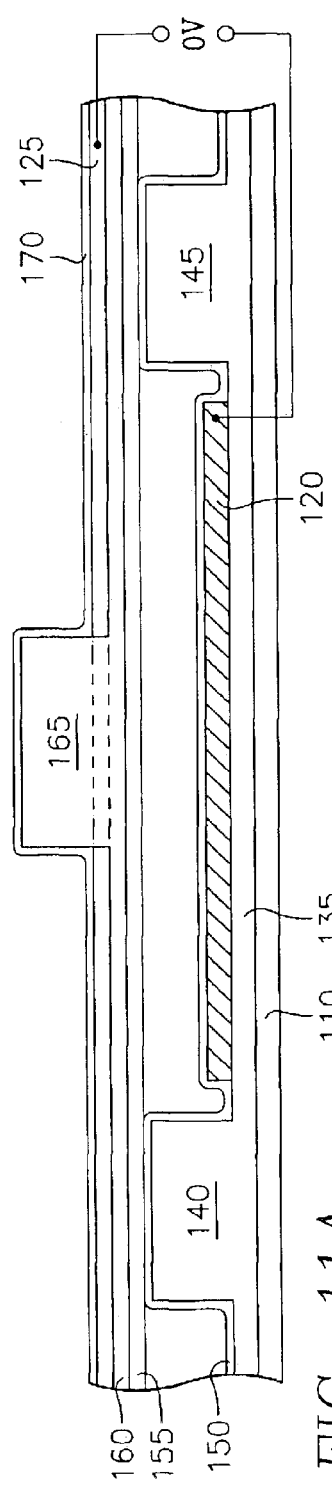
FIGS. 11A, 11B and 11C are chronologically successive cut-away side views of one layer in the embodiment of FIG. 1 illustrating an example of the addressing scheme of FIGS. 9 and 10A through 10C.
Figure 11B:
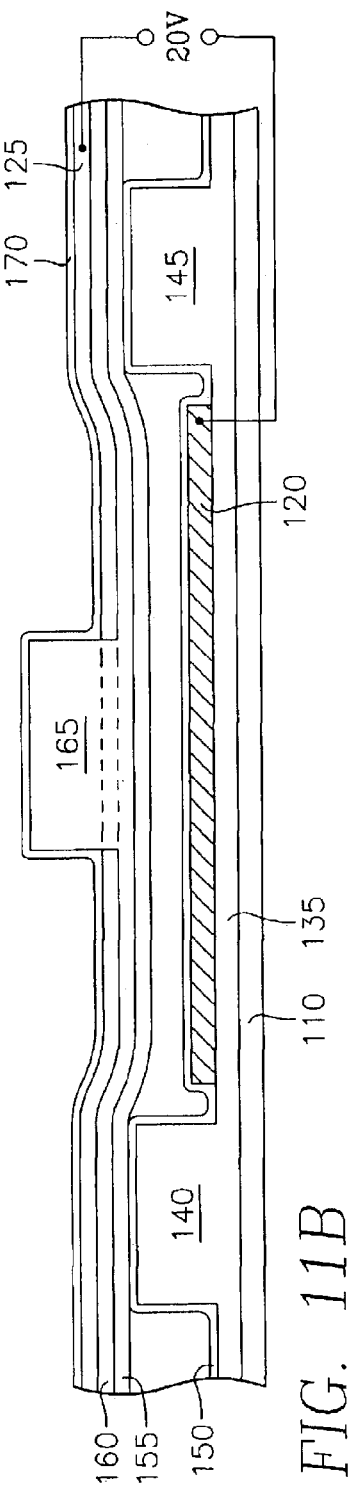
Figure 11C:
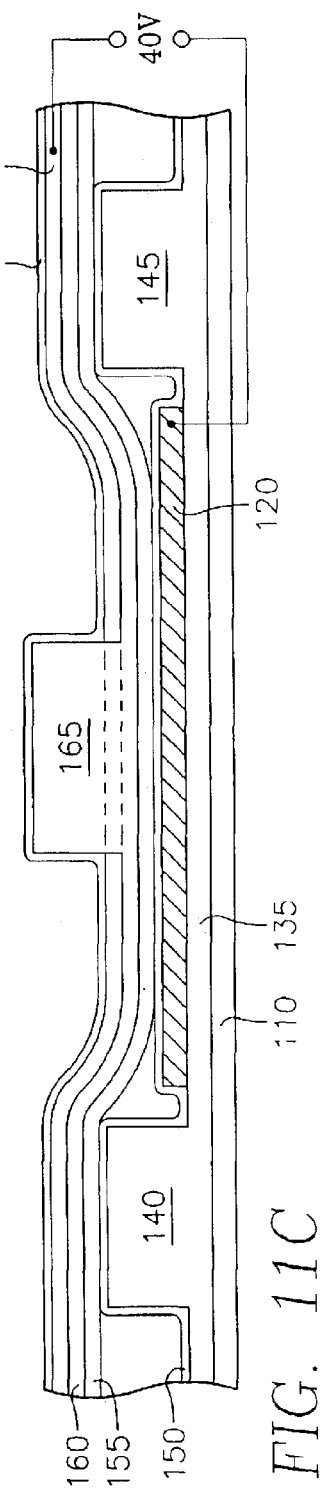

The foregoing characteristics are exploited in writing successive n-bit resolution images onto the n-layer light modulator of FIGS. 1–5. FIG. 9 illustrates how the image in a particular one of the layers 115–118 is written. First, a selected column electrode 120 is enabled by applying a portion (e.g., one half) of a voltage (e.g., 40 v) that is slightly in excess of the minimum write voltage of 38 v. In the present example, a voltage of 20 v is applied to the selected column electrode 120, as indicated by shading. This partially deforms all the pixels along the selected column electrode from the equilibrium condition of FIG. 11A to the partially deformed condition of FIG. 11B. Then, the image for the selected column is written by applying the inverse of the remaining portion of write voltage (e.g., −20 v in the present example) to each of the row electrodes 125 that are to be enabled. This last step raises the maximum voltage difference to 40 v, causing the electrode pairs in the selected rows of the one selected column to snap into maximum deformation (FIG. 11C). Thereafter, the selected column electrode is set to zero voltage while all the row electrodes are set to a voltage (e.g., 10 v) sufficient to retain maximum deformation. This procedure is illustrated in FIGS. 10A–10C, illustrating the control voltages applied to two different row electrodes (FIGS. 10A and 10B) and a column electrode (FIG. 10C). A first image (image 1) is formed by pulling the column electrode voltage (FIG. 10C) to −20 v. The first row electrode voltage (FIG. 10A) is raised to +20 v simultaneously, causing maximum deformation, and then set (along with all other row electrodes) to the holding voltage of +10 v when the column electrode voltage returns to zero. This retains any pixels that have a fully deformed electrode in their present state (to retain the image). Thereafter, the image is erased by resetting all of the voltages to zero. In the meantime, the second row electrode voltage (FIG. 10B) is not set to 20 v because it is not selected in image 1. Next, image 2 is written using the same procedure, except that the first row electrode (FIG. 10A) is not selected while the second row electrode (FIG. 10B) is selected. Again, the foregoing procedures are repeated in writing image 3, in which both row electrodes (FIGS. 10A and 10B) are selected.

The spatial light modulator of FIG. 1 may be tuned to work with a different wavelength of light. This is accomplished by applying a small constant bias voltage between all of the row and column electrodes 125, 120 of each layer. Referring to FIG. 2, for each individual layer 115, 116, 117, 118, a variable D.C. bias voltage source 410 has one voltage terminal connected to all of the row electrodes 125 of that layer and its opposite voltage terminal connected to all of the column electrodes 120 of that layer. Depending upon the polarity of this bias voltage, the flexible row electrodes 125 of that layer will deform to change all the compression gaps of that layer from the distance established by the height of the ribs 140, 145 to a different distance. A variable D.C. bias voltage source 410 is provided for each layer and adjusted as needed. The bias voltage source 410-1 for the first layer 115 is adjusted so that the initial compression gap in the first layer 115 is a quarter wavelength. The bias voltage source 410-2 for the second layer 116 is adjusted to set the initial compression gap in the second layer equal to an eighth wavelength. The bias voltage source 410-3 for the third layer 117 is adjusted to set the compression gap in the third layer equal to a sixteenth of a wavelength. All of the remaining layers are set in this same manner in accordance with ascending negative powers of 2 as a factor of the wavelength. Since this adjustment is made on a layer-by-layer basis, it may also be used to compensate for any fabrication differences between the layers (wherein, for example, the compression gaps of different layers are fractions of different wavelengths rather than fractions of a common wavelength. By providing individual variable bias voltage sources 410-1, 410-2, 410-3, etc., for the individual layers 115, 116, 117, etc., all of the layers may be precisely and individually tuned to a particular common wavelength so as to mask any process fabrication (dimensional) differences between them. The requisite bias voltages for making fractional wavelength adjustments of the compression gap (on the order of millivolts) is very small compared with the write voltages (+20 v and –20 v) and the holding voltage (+10 v), so that the bias voltage has little or no effect on the image writing process discussed above with reference to FIGS. 10A–10C.

While the foregoing discussion has considered the presence of only four layers 115–118 providing four-bit accuracy, the number of layers n may be as great as eight or more. An example of eight layers (n=8) having 8-bit accuracy is illustrated in FIG. 4. While the foregoing discussion has considered a phase correction of a half wavelength using a quarter wavelength deflection and in which successive fractions are defined in ascending negative powers of two, other fractions of a wavelength may be selected and successive fractions other than negative powers of two may be employed. While the foregoing discussion has considered the reflective layer to be on the top of the stack (for the case of n=4, over the top layer 118 of FIG. 1 that has the smallest compression gap), the order of the layers may be reverse, with the layer 115 having the largest compression gap being on top and directly supporting the reflective layer and the layer 118 having the smallest compression gap on the bottom so that the compression gap of successive layers increases from bottom to top in descending powers of negative two (for example).

The spatial light modulator of FIG. 1 has not only multi-bit phase resolution or accuracy, as described above, but also very fine spatial resolution. This is because the size of each pixel is on the order of only 10 microns on each side (each pixel being approximately square). This is because each of the ribbon conductors 120, 125 is 10 microns in width. There may be, for example, 32 row ribbon electrodes 125 and 32 column ribbon electrodes 120 in each of the layers, for a total of 1024 pixels. If the number of row electrodes in each layer is N and the number of column electrodes in each layer is also N, and furthermore if the number of layers is n, then the total number of outputs from the n-layer encoders 210, 215 of FIG. 2 is $2nN^2$. In the foregoing example, if the number of layers n is eight, then the total number of encoder outputs is $2nN^2=2\times8\times32^2=16,384$. While the given examples have either four or eight layers, the invention may be carried out with any suitable number of layers.

While the invention has been described in detail by specific reference to preferred embodiments, it is understood that variations and modifications thereof may be made without departing from the true spirit and scope of the invention.

What is claimed is:

1. A spatial light modulator comprising stacked layers of deformable electrode pairs supporting a deformable reflective surface, each electrode pair comprised in upper and lower stacked elongate ribbon conductors extending in respective orthogonal directions, each coincidence of an upper and lower electrode pair defining a pixel within the respective stacked layer, each electrode pair deforming to a maximum deformation in response to an applied write voltage across the pair so as to produce at the reflective layer a phase correction of the corresponding pixel proportional to the corresponding deformation.

2. The apparatus of claim 1 wherein the maximum deformation of the pixels in each stacked layer is substantially the same, and wherein the maximum deformation of successive layers decreases in ascending order of the stacked layers.

3. The apparatus of claim 1 wherein said maximum deformation decreases with successive ones of the stacked layers by ascending negative powers of 2, wherein a phase correction can be written to an individual one of said pixels with n-bit accuracy, wherein n is the number of said layers.

4. The apparatus of claim 1 wherein the lower ribbon conductors are mutually parallel in a first direction and coplanar in a first plane, and the upper ribbon conductors are mutually parallel in a second direction orthogonal to said first direction and coplanar in a second plane vertically displaced from said first plane.

5. The apparatus of claim 2 wherein said-reflective layer is supported on an exterior surface of an end one of said layers, said end layer being one of (a) at the beginning, (b) at the end of said ascending order.

6. The apparatus of claim 1 wherein each one of said layers further comprises elongate ribs between respective ones of the lower elongate ribbon conductors that are within said one layer, said ribs providing support to said upper elongate conductors to form therebetween a compression gap defining said maximum deformation.

7. The apparatus of claim 6 wherein each one of said layers further comprises a deformable membrane resting on top of said ribs and supporting the upper elongate ribbon conductors that are within said one layer.

8. The apparatus of claim 7 wherein each of said layers further comprises a table supporting the lower ribbon conductors of the bottom one of said layers and an insulating layer between said table and said lower ribbon conductors of the bottom one of said layers.

9. The apparatus of claim 7 wherein each one of said layers further comprises an insulating layer between said deformable membrane and said upper ribbon conductors.

10. The apparatus of claim 7 wherein each one of said layers further comprises an insulating layer covering said lower elongate ribbon conductors.

11. The apparatus of claim 10 wherein said elongate ribs are integrally formed with the insulating layer covering said lower elongate ribbon conductors.

12. The apparatus of claim 11 further comprising an insulating layer covering said upper elongate ribbon conductors.

13. The apparatus of claim 12 wherein each of said layers further comprises a pedestal extending between said upper elongate ribbon conductors and the table of the layer immediately above said one layer.

14. The apparatus of claim 13 wherein said pedestal is integrally formed with the insulating layer covering said upper elongate ribbon conductors.

15. The apparatus of claim 14 wherein said table and said membrane of each layer comprises a semiconductor material and said upper and lower elongate ribbon conductors comprise a metal.

16. The apparatus of claim 15 wherein said semiconductor material comprises instrinsic crystalline silicon and said insulating layers comprise silicon dioxide.

17. The apparatus of claim 8, wherein the upper and lower elongate conductors are organized in rows and columns, respectively, that are in vertical registration, said apparatus further comprising:

a substrate, said substrate supporting the table of the bottom one of said layers;

a row encoder along one edge of said substrate having a number of row outputs equal to the number of the upper elongate ribbon conductors in a given one of said layers, each of said row outputs having a number of separate bits equal to the number of said layers, each of said separate bits being connected to an upper elongate ribbon conductor in the corresponding layer; and a column encoder along another edge of said substrate having a number of column outputs equal to the number of the lower elongate ribbon conductors in a given one of said layers, each of said column outputs having a number of separate bits equal to the number of said layers, each of said separate bits being connected to a lower elongate ribbon conductor in the corresponding layer.

18. The apparatus of claim 17 further comprising respective variable D.C. bias voltage sources for respective ones of said layers, each variable D.C. bias voltage source having one terminal connected to all of the upper elongate ribbon conductors of the respective layer and an opposite terminal connected to all of the lower elongate ribbon conductors of the respective layer.

19. The apparatus of claim 18 wherein each of said variable bias voltage sources is set to a voltage level that sets the compression gaps of said layer to the requisite fraction of a wavelength of light to be reflected by said reflective layer.

20. The apparatus of claim 1 further comprising a pattern of voids cut out of each of said upper and lower elongate ribbon conductors to enable flexing thereof.

21. A spatial light modulator having n-bit phase resolution and comprising n electrically compressible layers of N×N pixels, each of said layers comprising N row electrodes in an upper thin film and N column electrodes in a lower thin film and insulated from said N row electrodes, each of said pixels constituting an intersection in respective planes of the row and column electrodes, the pixels of respective layers being in vertical registration, at least one of said row and column electrodes being deformable in response to an applied voltage therebetween, supporting structure separating said column and row electrodes from one another, said supporting structure leaving vertical compression gaps at each pixel between said row and column electrodes through which at least one of said row and column electrode can deform toward the other in response to the applied voltage, the pixels of adjacent layers being coupled together whereby deformations of overlying ones of said pixels are cumulative.

22. The apparatus of claim 21 wherein the compression gaps within a given one of said layers are of the same height and wherein the compression gaps of successive layers decrease in accordance with a numerical progression.

23. The apparatus of claim 22 wherein said numerical progression comprises ascending negative powers of a base number.

24. The apparatus of claim 22 further comprising an optically reflective coating on an external surface of an end one of said layers.

25. The apparatus of claim 23 wherein said base number is two and said numerical progression comprises successive fractions of a wavelength of a lightbeam reflected by said reflective coating.

26. The apparatus of claim 21 further comprising n variable bias voltage sources for adjusting the compression gaps of respective ones of said layers in accordance with the wavelength of a light beam to be modulated.

27. The apparatus of claim 21 further comprising:

a row encoder having N outputs, each of said N outputs having n bits connected to overlying row electrodes of said n layers; and a column encoder having N outputs, each of said N outputs having n bits connected to overlying column electrodes of said n layers.

28. A spatial light modulator having vertically arranged planar layers, each layer comprising a planar array of vertically displaced electrode pairs that are electrically addressable by row and column, and electrode separation ribs establishing a void between the electrodes of each pair, said void having a height defining a compression gap of said layer through which electrode pairs are deformable, electrode pairs of adjacent layers being in vertical registration and being coupled whereby deformations of pixels in vertical registration are cumulative.

29. The apparatus of claim 28 wherein the compression gaps of successive layers are determined in accordance with successive fractions of a wavelength of a light beam to be modulated.

* * * * *